United States Patent
Kato et al.

(10) Patent No.: US 9,758,601 B2
(45) Date of Patent: Sep. 12, 2017

(54) MODIFIED POLYVINYL ALCOHOL AND PRODUCTION METHOD THEREFOR

(71) Applicant: KURARAY CO., LTD., Kurashiki-shi (JP)

(72) Inventors: Masaki Kato, Kurashiki (JP); Keishi Hachiya, Kurashiki (JP); Tatsuya Tanida, Kurashiki (JP); Keisuke Morikawa, Kurashiki (JP); Yusuke Amano, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/108,155

(22) PCT Filed: Dec. 25, 2014

(86) PCT No.: PCT/JP2014/084212
§ 371 (c)(1),
(2) Date: Jun. 24, 2016

(87) PCT Pub. No.: WO2015/098996
PCT Pub. Date: Jul. 2, 2015

(65) Prior Publication Data
US 2016/0319048 A1 Nov. 3, 2016

(30) Foreign Application Priority Data
Dec. 26, 2013 (JP) .................................. 2013-270328

(51) Int. Cl.
C08F 8/12 (2006.01)
C08F 116/06 (2006.01)
C08F 216/06 (2006.01)

(52) U.S. Cl.
CPC .............. C08F 8/12 (2013.01); C08F 116/06 (2013.01); C08F 216/06 (2013.01); C08F 2800/10 (2013.01)

(58) Field of Classification Search
None
See application file for complete search history.

(56) References Cited

U.S. PATENT DOCUMENTS

| | | | |
|---|---|---|---|
| 2,909,502 A | 10/1959 | Matsumoto et al. | |
| 4,879,336 A | 11/1989 | Schilling et al. | |
| 5,070,126 A * | 12/1991 | Toyonishi | C08J 5/18 524/224 |
| 2003/0178608 A1* | 9/2003 | Isozaki | C08J 5/18 252/585 |

FOREIGN PATENT DOCUMENTS

| | | |
|---|---|---|
| JP | 30-6485 B1 | 9/1955 |
| JP | 62-179550 A | 8/1987 |
| JP | 62-220540 A | 9/1987 |
| JP | 63-20371 A | 1/1988 |
| JP | 1-229805 A | 9/1989 |
| JP | 8-284013 A | 10/1996 |
| JP | 8-319318 A | 12/1996 |
| JP | 9-77947 A | 3/1997 |
| JP | 9-136916 A | 5/1997 |
| JP | 10-25329 A | 1/1998 |
| JP | 11-279210 A | 10/1999 |
| JP | 2002-284818 A | 10/2002 |
| JP | 2014-173046 A | 9/2014 |
| WO | 2015/020046 A1 | 2/2015 |

OTHER PUBLICATIONS

Masato et al., electronic translation of JP 10-25329 (Jan. 1998).*
International Search Report dated Mar. 24, 2015 for PCT/JP2014/084212 filed on Dec. 25, 2014.

* cited by examiner

*Primary Examiner* — Jeffrey Mullis
(74) *Attorney, Agent, or Firm* — Oblon, McClelland, Maier & Neustadt, L.L.P.

(57) ABSTRACT

Provided is a modified polyvinyl alcohol containing 0.1 to 10 mol % of a monomer unit represented by formula (1) below and having a degree of polymerization exceeding 2000. This provides a modified polyvinyl alcohol an aqueous solution of which foams less and which has excellent film strength and gas barrier properties under high humidity conditions, while having excellent water solubility.

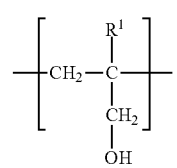

(1)

[In formula (1), $R^1$ represents a hydrogen atom or a methyl group.]

2 Claims, 1 Drawing Sheet

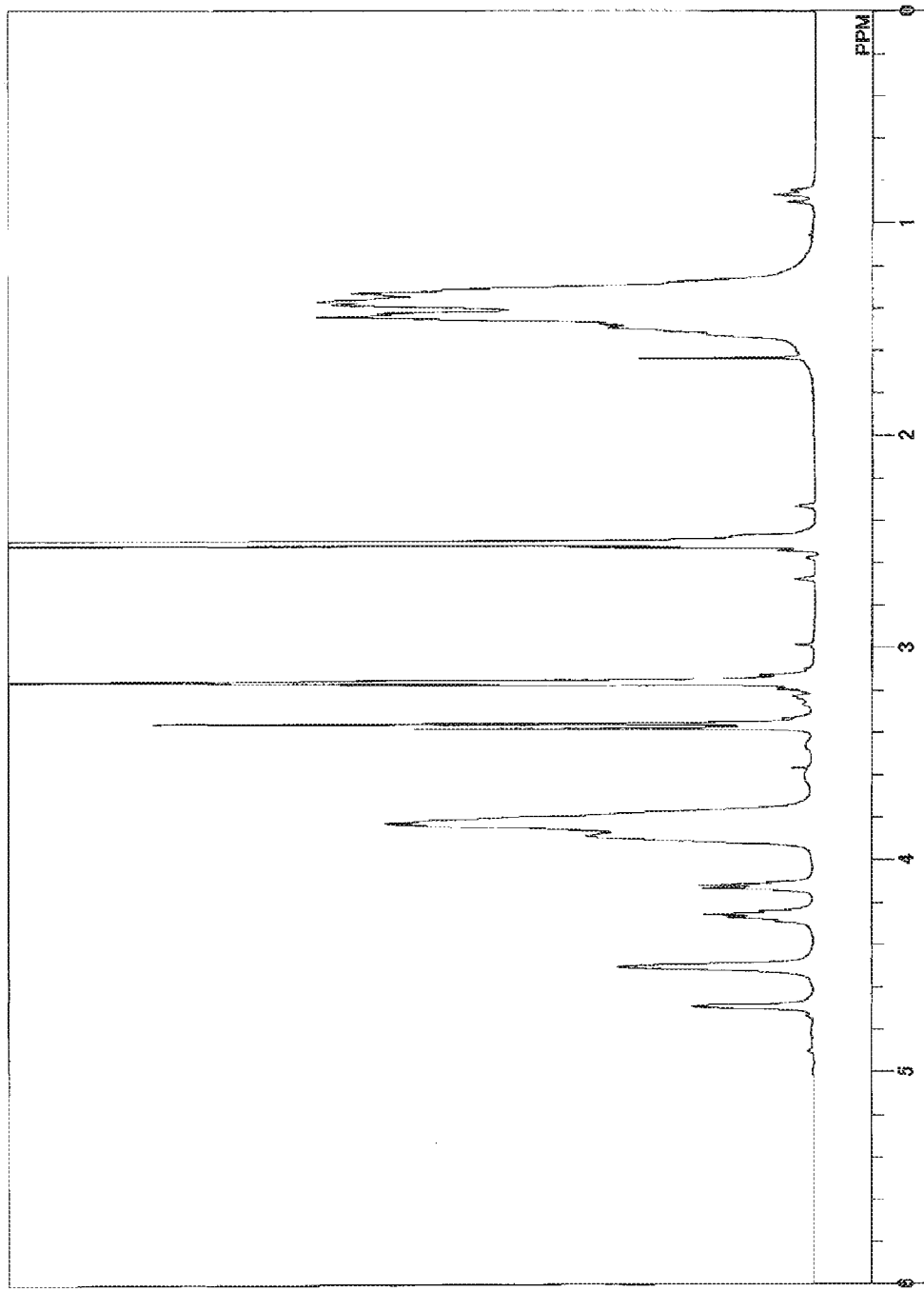

MODIFIED POLYVINYL ALCOHOL AND PRODUCTION METHOD THEREFOR

TECHNICAL FIELD

The present invention relates to a modified polyvinyl alcohol having a hydroxymethyl group bonded to its main chain and method for producing the modified polyvinyl alcohol.

BACKGROUND ART

Polyvinyl alcohol is one of the few crystalline water-soluble polymers. Utilizing its excellent water-solubility, film properties (such as strength, oil resistance, film-forming properties, and oxygen gas barrier properties), polyvinyl alcohol is widely used for emulsifiers, suspending agents, surfactants, fiber processing agents, various binders, paper processing agents, adhesives, films, and the like. Polyvinyl alcohol is used in the form of an aqueous solution except for special cases, where there may be difficulties in handling in some cases. For example, in preparation of the aqueous solution, there may be cases where polyvinyl alcohol remains as undissolved matter unless heating is performed at high temperature for a long time.

As a method for improving the water solubility of polyvinyl alcohol, a method of introducing an ionic group into polyvinyl alcohol is known. However, in the method of introducing an ionic group, a film to be formed tends to absorb moisture and may have low strength in some cases.

Patent Document 1 discloses a modified polyvinyl alcohol containing a hydroxyalkyl group having 2 to 20 carbon atoms in its side chain. It is described that an aqueous solution of the modified polyvinyl alcohol slightly foams despite its high surface activity. However, in the case of using the modified polyvinyl alcohol, although the water solubility is improved, film strength and gas barrier properties are insufficient. Thus, a further improvement has been desired.

Patent Document 2 discloses a composition containing an aqueous emulsion using a modified polyvinyl alcohol containing a monomer unit represented by formula (3) below as a dispersant, and use of the composition as an adhesive. The modified polyvinyl alcohol used in the composition is merely used as a dispersant in emulsion polymerization, and there is no description about the properties of the modified polyvinyl alcohol itself. Further, only the modified polyvinyl alcohol that contains a 3-methyl-3-buten-1-ol unit and that has a structure in which a 2-hydroxyethyl group is bonded to its main chain is used in Examples of Patent Document 2.

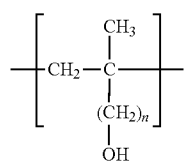

(3)

Patent Document 3 discloses a modified polyvinyl alcohol containing a 1,2-glycol component in its side chain, and it is described that an aqueous solution of the modified polyvinyl alcohol has excellent viscosity stability. However, in the case of using the modified polyvinyl alcohol, there has been a problem that film strength and gas barrier properties are reduced under high humidity conditions due to the influence of moisture absorption.

Patent Document 4 discloses a polyvinyl alcohol in which the content of 1,2-glycol bond in its main chain is increased by polymerization at a temperature higher than normal. It is described that an aqueous solution of the polyvinyl alcohol has excellent viscosity stability at low temperature. However, in the case of using the polyvinyl alcohol, there has been a problem that film strength and gas barrier properties are reduced under high humidity conditions due to the influence of moisture absorption.

PRIOR ART DOCUMENTS

Patent Documents

Patent Document 1: JP 8-319318 A
Patent Document 2: JP 10-25329 A
Patent Document 3: JP 2002-284818 A
Patent Document 4: JP 11-279210 A

SUMMARY OF THE INVENTION

Problems to be Solved by the Invention

The present invention has been accomplished in order to solve the above-described problems, and it is an object of the present invention to provide a modified polyvinyl alcohol an aqueous solution of which foams less and which has excellent film strength and gas barrier properties under high humidity conditions, while having excellent water solubility. Further, it is another object of the present invention to provide a method for producing such a modified polyvinyl alcohol.

Means for Solving the Problems

The above-described problems are solved by providing a modified polyvinyl alcohol containing 0.1 to 10 mol % of a monomer unit represented by formula (1) below and having a degree of polymerization exceeding 2000.

(1)

[In formula (1), $R^1$ represents a hydrogen atom or a methyl group.]

In this regard, a content of a 1,2-glycol bond in a main chain is preferably 1.5 mol % or less. Further, $R^1$ is preferably a methyl group.

Further, the above-described problems are solved also by providing a method for producing the above-described modified polyvinyl alcohol, the method including copolymerizing a vinyl ester monomer with a compound represented by formula (2) below, followed by saponification.

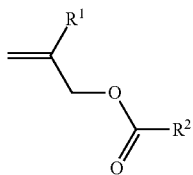

(2)

[In formula (2). $R^1$ is the same as in formula (1), and $R^2$ represents an alkyl group having 1 to 10 carbon atoms.]

Effects of the Invention

The present invention provides a modified polyvinyl alcohol which has excellent water solubility and an aqueous solution of which foams less. Further, a film containing the modified polyvinyl alcohol has high strength and excellent gas barrier properties even under high humidity conditions.

BRIEF DESCRIPTION OF THE DRAWING

FIG. 1 is a $^1$H-NMR spectrum of a modified polyvinyl alcohol obtained in Example 1.

MODES FOR CARRYING OUT THE INVENTION

The modified polyvinyl alcohol of the present invention has a monomer unit represented by formula (1) below.

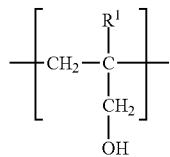

(1)

[In formula (1), $R^1$ represents a hydrogen atom or a methyl group.]

The modified polyvinyl alcohol of the present invention can reduce the crystallinity of polyvinyl alcohol to improve the water solubility by having the monomer unit represented by formula (1) above. Further, since the modified polyvinyl alcohol of the present invention has high hydrogen bonding force, a film containing the modified polyvinyl alcohol can mitigate the reduction in strength caused by the reduction in crystallinity and can maintain the toughness and the gas barrier properties even under high humidity conditions. The modified polyvinyl alcohol of the present invention has contradictory features of having good film properties under high humidity conditions while having excellent water solubility.

In formula (1), $R^1$ is a hydrogen atom or a methyl group. $R^1$ is preferably a methyl group. When $R^1$ is a methyl group, water resistance under high humidity conditions is improved, and therefore a film having high strength under high humidity conditions is obtained.

In the modified polyvinyl alcohol of the present invention, the content of the monomer unit represented by formula (1) is 0.1 to 10 mol %. This content (mol %) is the content of the monomer unit represented by formula (1) in the total monomer units (100 mol %) contained in the modified polyvinyl alcohol. When the content of the monomer unit represented by formula (1) is less than 0.1 mol %, the water solubility becomes insufficient. The content is suitably 0.2 mol %, or more, more suitably 0.3 mol % or more. On the other hand, when the content of the monomer unit represented by formula (1) exceeds 10 mol %, the crystallinity of the modified polyvinyl alcohol is extremely reduced, and the film toughness and gas barrier properties cannot be maintained under high humidity conditions. The content is suitably 9 mol % or less, more suitably 8 mol % or less, further suitably 4 mol % or less.

The degree of polymerization of the modified polyvinyl alcohol of the present invention is required to exceed 2000. When the degree of polymerization is 2000 or less, the strength of the film to be formed is reduced. The degree of polymerization is suitably 2100 or more, more suitably 2200 or more. Further, the degree of polymerization is generally 6000 or less. Note that, the degree of polymerization in the present invention is a viscosity-average degree of polymerization measured according to JIS K6726 (1994).

The degree of saponification of the modified polyvinyl alcohol of the present invention is not specifically limited, but is preferably 80 to 99.9 mol % in view of the film strength under high humidity conditions. When the degree of saponification is less than 80 mol %, the film to be formed may fail to have sufficient strength and gas barrier properties in some cases. The degree of saponification is more preferably 90 mol % or more, further preferably 95 mol % or more. On the other hand, a modified polyvinyl alcohol having a degree of saponification exceeding 99.9 mol % is generally difficult to produce. The degree of saponification is more preferably 99.5 mol % or less. Note that, the degree of saponification means the mole fraction of hydroxyl groups with respect to the total of hydroxyl groups and ester groups in the modified polyvinyl alcohol.

In the modified polyvinyl alcohol of the present invention, the content of 1,2-glycol bond in the main chain is preferably 1.5 mol % or less. By reducing a content of 1,2-glycol bond in the main chain, the film containing the modified polyvinyl alcohol can have high strength and high gas barrier properties even under high humidity conditions. The content of 1,2-glycol bond in the main chain is more preferably 1.48 mol % or less. The content of 1,2-glycol bond in the main chain is generally 1.3 mol % or more. The content of 1,2-glycol bond can be controlled by various methods, for example, by selecting the vinyl ester or the solvent, by adjusting the polymerization temperature, and by copolymerizing vinylene carbonate. As an industrial control method, by adjusting the polymerization temperature is preferable in the present invention.

The method for producing the modified polyvinyl alcohol of the present invention is not specifically limited. Examples thereof include a method of copolymerizing vinyl ester monomers with unsaturated monomers that are copolymerizable with the vinyl ester monomers and that can be converted into the monomer units represented by formula (1), followed by saponification of the vinyl ester units of the obtained copolymer, so as to convert them into vinyl alcohol units. Here, suitable examples of the unsaturated monomers that can be converted into the monomer units represented by formula (1) include a compound represented by formula (2) below. Note that, the monomer units derived from the compound represented by formula (2) can form hydroxyl groups by being hydrolyzed simultaneously with the vinyl ester units at the time of the saponification of the copolymer. Further, the copolymerization can be also achieved by using 2-propen-1-ol (allyl alcohol) or 2-methyl-2-propen-1-ol (β-methallyl alcohol) as the unsaturated monomers.

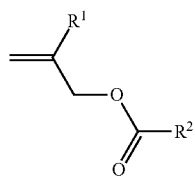

(2)

[In formula (2), $R^1$ is the same as in formula and $R^2$ represents an alkyl group having 1 to 10 carbon atoms.]

In formula (2), $R^2$ represents an alkyl group having 1 to 10 carbon atoms. The structure of $R^2$ is not specifically limited, and a branched structure or a cyclic structure may be included. Further, a part of hydrogen atoms of the alkyl group may be substituted with other functional groups, and examples of such a functional group include an alkoxy group, a halogen atom, and a hydroxyl group. $R^2$ is preferably an alkyl group having 1 to 5 carbon atoms, and suitable examples thereof include alkyl groups having a straight chain or a branched chain such as a methyl group, an ethyl group, a n-propyl group, an isopropyl group, a n-butyl group, an isobutyl group, a tert-butyl group, and a pentyl group.

Specific examples of the unsaturated monomers represented by formula (2) include 2-propenyl acetate and 2-methyl-2-propenyl acetate. In particular, 2-methyl-2-propenyl acetate is preferably used in view of safety and ease of production.

The vinyl ester monomers to be used for producing the modified polyvinyl alcohol of the present invention are not specifically limited. Specifically, examples thereof include vinyl formate, vinyl acetate, vinyl propionate, vinyl butyrate, vinyl isobutyrate, vinyl pivalate, vinyl versatate, vinyl caproate, vinyl caprylate, vinyl laurylate, vinyl palmitate, vinyl stearate, vinyl oleate, and vinyl benzoate. From an economic point of view, vinyl acetate is preferred.

As the polymerization process in the copolymerization of the unsaturated monomers represented by formula (2) with the vinyl ester monomers, any one of batch polymerization, semi-batch polymerization, continuous polymerization, and semi-continuous polymerization may be used, in addition, as a polymerization method, known methods such as bulk polymerization, solution polymerization, suspension polymerization, and emulsion polymerization can be used. Bulk polymerization or solution polymerization, in which polymerization proceeds without solvent or in a solvent such as alcohol, is generally employed. For obtaining a vinyl ester copolymer with a high degree of polymerization, employment of emulsion polymerization becomes an option. Although the solvent used in solution polymerization is not particularly limited, alcohol is preferred. As the alcohol used as a solvent in the solution polymerization, lower alcohols such as methanol, ethanol, and propanol are more preferred. The use amount of the solvent in solution polymerization may be selected in consideration of chain transfer of the solvent corresponding to the degree of polymerization of the polymer to be obtained. For example, in the case of using methanol as the solvent, the use amount is selected from the range in which the mass ratio of the solvent to the total monomers [(solvent)/(total monomers)] is 0.01 to 10, preferably 0.05 to 3.

A polymerization initiator used for copolymerization of the unsaturated monomers represented by formula (2) with the vinyl ester monomers is selected from known polymerization initiators such as azo initiators, peroxide initiators, and redox initiators, according to the method of polymerization. Examples of the azo initiators include 2,2'-azobisisobutyronitrile, 2,2'-azobis (2,4-dimethylvaleronitrile), and 2,2'-azobis (4-methoxy-2,4-dimethylvaleronitrile). Examples of the peroxide initiators include percarbonate compounds such as diisopropyl peroxydicarbonate, di-2-ethylhexyl peroxydicarbonate, and diethoxyethyl peroxydicarbonate; perester compounds such as t-butylperoxy neodecanoate and α-cumylperoxy neodecanoate; and acetylcyclohexylsulfonyl peroxide; and 2,4,4-trimethylpentyl-2-peroxyphenoxyacetate. Potassium persulfate, ammonium persulfate, hydrogen peroxide, and the like may also be used in combination with the above initiators to serve as a polymerization initiator. Examples of the redox initiators include a polymerization initiator obtained by combining the above peroxide initiators with a reducing agent such as sodium hydrogen sulfite, sodium hydrogen carbonate, tartaric acid, L-ascorbic acid, and rongalite. The use amount of the polymerization initiator is different depending on the polymerization catalyst and thus cannot be generalized, but it is selected corresponding to the polymerization rate. For example, in the case of using a peroxide initiator such as azobisisobutyronitrile or acetyl peroxide as a polymerization initiator, the use amount is preferably 0.01 to 0.2 mol %, more preferably 0.02 to 0.15 mol %, with respect to the vinyl ester monomers.

The polymerization temperature in the copolymerization of the unsaturated monomers represented by formula (2) with the vinyl ester monomers is preferably room temperature or higher and 150° C. or lower, more preferably room temperature or higher and the boiling point of the solvent to be used or lower, particularly preferably 30 to 60° C. In this regard, in order to reduce the content of 1,2-glycol bond in the main chain, the polymerization temperature is further preferably 55° C. or lower.

The copolymerization of the unsaturated monomers represented by formula (2) with the vinyl ester monomers may be performed in the presence of a chain transfer agent, as long as the effects of the present invention are not impaired. Examples of the chain transfer agent include aldehydes such as acetaldehyde and propionaldehyde; ketones such as acetone and methylethylketone; mercaptans such as 2-hydroxyethanethiol; and phosphinates such as sodium phosphinate monohydrate. Above all, aldehydes and ketones are preferably used. Although the addition amount of the chain transfer agent to the polymerization reaction liquid is determined according to the chain transfer constant of the chain transfer agent to be added and the target degree of polymerization, generally, the addition amount is preferably 0.1 to 10 parts by mass with respect to 100 parts by mass of the vinyl ester monomers.

The modified polyvinyl alcohol of the present invention can be obtained by saponification of the vinyl ester copolymer obtained by the copolymerization of the unsaturated monomers represented by formula (2) with the vinyl ester monomers. The saponification of the vinyl ester copolymer allows the vinyl ester units in the copolymer to be converted into vinyl alcohol units. Further, the ester bonds in the monomer units derived from the unsaturated monomers represented by formula (2) are also hydrolyzed at the same time, so as to be converted into the monomer units represented by formula (1). Accordingly, the modified polyvinyl alcohol of the present invention can be produced without conducting an additional reaction such as hydrolysis after the saponification.

For the saponification of the vinyl ester copolymer, known methods can be used. For example, the saponification can be performed in the state where is the copolymer is dissolved in an alcohol or hydrous alcohol solution. The alcohol used herein is lower alcohols such as methanol and ethanol, and is preferably methanol. The alcohol used for the saponification may contain a solvent such as acetone, methyl acetate, ethyl acetate, and benzene, within a content of not more than 40 mass %. The catalyst used for the saponification is, for example, alkali metal hydroxides such as potassium hydroxide and sodium hydroxide; alkali catalysts such as sodium methylate; and acid catalysts such as mineral acid. Although the temperature to carry out the saponification is not limited, it is preferably in the range of 20 to 60° C. In the case where gelatinous products precipitate as the saponification proceeds, the modified polyvinyl alcohol can be obtained by grinding the products, followed by washing and drying.

The modified polyvinyl alcohol of the present invention can further contain monomer units other than the monomer unit represented by formula (1), the vinyl alcohol units, and the vinyl ester units, as long as the effects of the present invention are obtained. Such other monomer units are monomer units derived from ethylenically unsaturated monomers that are copolymerizable with vinyl ester. Examples of the ethylenically unsaturated monomers include α-olefins such as ethylene, propylene, n-butene, isobutylene, and 1-hexene; acrylic acid and salts thereof; unsaturated monomers containing an acrylic ester group; methacrylic acid and salts thereof; unsaturated monomers containing a methacrylic ester group; acrylamide, N-methylacrylamide, N-ethylacrylamide, N,N-dimethylacrylamide, diacetoneacrylamide, acrylamide propane sulfonic acid and salts thereof, and acrylamidopropyl dimethylamine and salts thereof (for example, quaternary salts); methacrylamide. N-methylmethacrylamide, N-ethylmethacrylamide, methacrylamide propane sulfonic acid and salts thereof, and methacrylamidopropyl dimethylamine and salts thereof (for example, quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and salts or esters thereof; vinylsilyl compounds such as vinyltrimethoxysilane; and isopropenyl acetates. Further, the other monomer units also include monomer units that are derived from the unsaturated monomers represented by formula (2) and are not saponified. The content of the other monomer units is preferably 10 mol % or less, more preferably 5 mol % or less.

The arrangement sequence of the monomer units represented by formula (1), the vinyl alcohol units, the vinyl ester units, and the other monomer units in the modified polyvinyl alcohol of the present invention is not particularly limited, and may be any one of random arrangement, block arrangement, alternate arrangement, and the like.

Further, in the modified polyvinyl alcohol of the present invention, additives such as fillers, processing stabilizers, e.g., copper compounds, weathering stabilizers, coloring agents, ultraviolet absorbers, light stabilizers, antioxidants, antistatic agents, flame retardants, plasticizers, other thermoplastic resins, lubricants, perfumes, defoamers, deodorizers, extenders, removers, mold release agents, reinforcing material, crosslinking agents, fungicides, preservatives, and crystallization retarders can be appropriately mixed, as needed.

The modified polyvinyl alcohol of the present invention can be used individually or as a composition to which another component is added, particularly as an aqueous composition, for various applications in which polyvinyl alcohol is generally used, according to known methods such as forming, spinning, and emulsification, making use of its properties. For example, it can be used as surfactants for various applications, various coating agents, additives for paper, pigment binders, paints, warp sizing agents, fiber processing agents, sizing agents for hydrophobic fibers such as polyester, various films, sheets, bottles, fibers, thickeners, flocculants, soil modifiers, ion-exchange resins, and ion-exchange membranes.

The method for forming the modified polyvinyl alcohol of the present invention is not specifically limited. Examples of the forming method include a method of forming the modified polyvinyl alcohol in the form of a solution in which the modified polyvinyl alcohol is dissolved in water, dimethylsulfoxide, or the like, that is a solvent of the polymer (such as cast molding); a method of forming the modified polyvinyl alcohol by heating the polymer for plasticization (such as extrusion molding, injection molding, inflation molding, press forming, and blow molding) A formed product having any shape such as films, sheets, tubes, and bottles is obtained by such a forming method.

The modified polyvinyl alcohol of the present invention is particularly suitable for applications as additives for paper or various aqueous coating agents since it has excellent film strength and gas barrier properties under high humidity conditions. Further, the modified polyvinyl alcohol is useful in such applications, because the water solubility of polyvinyl alcohol affects the process simplification, so that the high water-solublity of the modified polyvinyl alcohol of the present invention advantageously functions.

EXAMPLES

Next, the present invention will be described further in detail by examples. However, the present invention is not limited to these examples in all respects. Hereinafter, polyvinyl alcohol including the modified polyvinyl alcohol may be abbreviated as PVA. The units "%" and "parts" in Examples and Comparative Examples respectively represent "mass %" and "parts by mass", unless otherwise specified.

The primary structure of PVA was quantitatively analyzed by $^1$H-NMR. The degree of polymerization of PVA was measured by the following method, and the water solubility, the foaming and defoaming properties, and the film strength under high humidity conditions were evaluated by the following methods.

[Content of 1,2-glycol Bond]

The content of 1,2-glycol bond in the main chain of PVA can be determined from NMR peaks. PVA which was saponified to a degree of saponification of 99.9 mol % or more, followed by sufficient washing with methanol and drying at 90° C. under reduced pressure for 2 days, was dissolved in DMSO-$d_6$. Then, a sample to which a few drops of trifluoroacetic acid were added was measured using a 500-MHz $^1$H-NMR (JEOL GX-500) at 80° C. The peak derived from methine in the vinyl alcohol units was at 3.2 to 4.0 ppm (integral value A), and the peak derived from one methine in the 1,2-glycol bond was at 3.25 ppm (integral value B). The content of 1,2-glycol bond can be calculated by the following formula.

Content of 1,2-glycol bond (mol %)=(B/M)×100

[Degree of Polymerization]

In the case where a PVA has a degree of saponification of less than 99.5 mol %, the PVA was saponified to have a degree of 99.5 mol % or more, and the viscosity-average degree of polymerization (P) of the PVA was determined by the following formula from the intrinsic viscosity [η] (liter/g) measured at 30° C. in water.

$P=([\eta]\times 10^4/8.29)^{(1/0.62)}$

[Water Solubility of PVA]

95 g of water at 15° C. was put in a 300-ml separable flask with a stirrer that was placed in a water bath, and was stirred at 300 rpm. 5 g of PVA having a particle size such that the particles pass through a 16-mesh wire screen was put into the water, and its temperature was raised to 80° C. After the lapse of 30 minutes, the aqueous solution was filtered by a 200-mesh wire screen, and the presence or absence of undissolved matter was evaluated by visual inspection.

A: No undissolved matter remaining
B: Slight amount of undissolved matter remaining
C: Large amount of undissolved residue remaining

[Foaming Properties of 4% Aqueous Solution]

A 4% aqueous solution of PVA at 20° C. was prepared and was introduced into an erected glass tube (with an inner diameter of 4.5 cm and a height of 150 cm) to a depth of 20 cm. After pump circulation (the aqueous solution was withdrawn from the lower part of the glass tube and was returned to the uppermost part of the glass tube) for 15 minutes at a rate of 1.5 liters/minute, the height of generated foam when the pump circulation was stopped was measured. The results are shown by the following symbols.

A: Height of generated foam: 49 cm or less
B: Height of generated foam: 50 to 74 cm
C: Height of generated foam: 75 cm or more

[Film Strength Under High Humidity Conditions]

A PVA aqueous solution with a concentration of 4% was prepared, and the solution was casted on a PET film, followed by drying at 20° C. for one week, to obtain a film with a thickness of about 40 μm. The obtained film was cut into a strip shape of 10 mm×80 mm, and was humidified at 20° C. and a humidity of 80% for one week. Thereafter, the strength and elongation were measured under conditions of a distance between chucks of 50 mm and a stretching rate of 500 mm/minute, using "AG-IS", manufactured by SHIMADZU CORPORATION, to determine the toughness from a stress-strain curve. The measurement was conducted 5 times for each sample to determine the average thereof, which was evaluated using the following criteria.

A: 300 kgf/mm or more
B: 280 kgf/mm or more and less than 300 kgf/mm
C: 240 kgf/mm or more and less than 280 kgf/mm
D: Less than 240 kgf/mm

[Oxygen Barrier Properties Under High Humidity Conditions]

100 g of PVA was dissolved in 400 g of distilled water to produce a PVA aqueous solution with a concentration of 20 wt %. Next, the aforementioned coating solution was applied to one side of a 20-μm thick OPP substrate film to a thickness of a gas barrier layer after drying of 50 μm, followed by drying at 100° C. and separation from the OPP substrate film, to obtain a sample film. A part of the sample film was cut out and was humidified at 20° C. and 85% RH for 5 days, and thereafter the oxygen permeability (cc/m²·day·atm) was measured using MOCON OX-TRAN2/20 type (MODERN CONTROLS INC.) under conditions of 20° C. and 85% RH according to the method described in JIS K7126 (equal-pressure method). Using the thickness of the barrier layer that had been separately measured, the oxygen permeability (cc/m²·day·atm) was determined in terms of the thickness of the barrier layer of 20 μm.

Example 1

1969 parts by mass of vinyl acetate, 231 parts by mass of methanol, and 26.8 parts by mass of 2-methyl-2-propenyl acetate (MAAc) as a comonomer were put into a reactor equipped with a stirrer, a reflux condenser, an argon inlet tube, and an addition port for an initiator, and the inside of the system was substituted with argon for 30 minutes under argon bubbling. Raising the temperature of the reactor was started, and when the internal temperature reached 60° C., 0.2 g of 2,2'-azobisisobutyronitrile (AIBN) was added thereto to start polymerization. After polymerization at 60° C. for 220 minutes, the polymerization was stopped by cooling. The MAAc is the compound represented by formula (2) in which $R^1$ and $R^2$ are each a methyl group. The polymerization ratio when the polymerization was stopped was 27%. Subsequently, unreacted monomers were removed while methanol was occasionally added under reduced pressure at 30° C. to obtain a methanol solution (with a concentration of 33.5%) of vinyl acetate/2-methyl-2-propenyl acetate copolymer (modified PVAc). Next, 95.8 parts by mass of methanol was added to 149 parts by mass of the methanol solution (50 parts by mass of the modified PVAc in the solution), and 4.72 g of a methanol solution of sodium hydroxide (with a concentration of 13.3%) was further added thereto, followed by saponification at 40° C. The concentration of the modified PVAc in the saponification solution was 20%, and the molar ratio of sodium hydroxide with respect to vinyl acetate units in the modified PVAc was 0.03. A gel product was generated after the lapse of about 7 minutes from the addition of the methanol solution of sodium hydroxide, and the gel product was ground in a grinder. Further, it was allowed to stand at 40° C. for 53 minutes to proceed the saponification. Thereafter, remaining alkali was neutralized by adding 200 parts by mass of methyl acetate. After the completion of neutralization was confirmed using a phenolphthalein indicator, a white solid was obtained by filtration, and 500 g of methanol was added thereto, followed by heating to reflux for one hour. After the above-described washing operation was repeated three times, the white solid obtained by centrifugal dehydration was dried in a vacuum dryer at 40° C. for 24 hours, to obtain a modified PVA containing a monomer unit (with $R^1$ being a methyl group) represented by general formula (1). The synthesis conditions are shown in Table 1. The degree of polymerization was 2400, the degree of saponification was 98.5 mol %, the amount of modification (the content of the monomer unit represented by formula (1) in the modified PVA) was 1.0 mol %, and the content of 1,2-glycol bond was 1.6 mol %. The content of the monomer unit represented by formula (1) was determined by comparing an integral value of the peak derived from hydrogen atoms in the methyl group of $R^1$ with an integral value of the peak of hydrogen atoms derived from the vinyl alcohol units in $^1$H-NMR spectrum. The $^1$H-NMR spectrum is shown in FIG. 1. The analysis results and evaluation results for the resultant modified PVA are shown in Table 2.

Examples 2 to 4 and Comparative Example 1

A modified PVA was produced in the same manner as in Example 1 except that the introduced amount of vinyl acetate and methanol, the addition amount of the comonomer used in the polymerization, the polymerization temperature, the polymerization ratio, and the saponification conditions were changed as shown in Table 1. The analysis results and evaluation results for the resultant modified PVA are shown in Table 2.

Comparative Example 2

1804 parts by mass of vinyl acetate and 396 parts by mass of methanol were put into a reactor equipped with a stirrer, a reflux condenser, an argon inlet tube, and an addition port for an initiator, and the inside of the system was substituted with argon for 30 minutes under argon bubbling. Raising the temperature of the reactor was started, and when the internal temperature reached 60° C., 0.3 g of AIBN was added thereto to start polymerization. After polymerization at 60° C. for 180 minutes, the polymerization was stopped by cooling. The polymerization ratio when the polymerization was stopped was 32%. Subsequently, unreacted monomers were removed while methanol was occasionally added under reduced pressure at 30° C. to obtain a methanol solution (with a concentration of 30%) of polyvinyl acetate (PVAc). Next, 497 parts by mass of a methanol solution (100 parts by mass of PVAc in the solution) was prepared by adding methanol to it, and 14.0 parts by mass of a methanol solution of sodium hydroxide (with a concentration of 10.0%) was added thereto, followed by saponification at 40° C. The concentration of the PVAc in the saponification solution was 20%, and the molar ratio of sodium hydroxide with respect to the vinyl acetate units in the PVAc was 0.03. A gel product was generated after the lapse of about 1 minute from the addition of the methanol solution of sodium hydroxide, and the gel product was ground in a grinder. Further, it was allowed to stand at 40° C. for 59 minutes to proceed the saponification. Thereafter, remaining alkali was neutralized by adding 500 parts by mass of methyl acetate. After the completion of neutralization was confirmed using a phenolphthalein indicator, a white solid was obtained by filtration, and 2000 g of methanol was added thereto, followed by heating to reflux for one hour. After the above-described washing operation was repeated three times, the white solid obtained by centrifugal dehydration was dried in a vacuum dryer at 40° C. for 24 hours, to obtain an unmodified polyvinyl alcohol (PVA). The synthesis conditions are shown in Table 1. The degree of polymerization was 2400, the degree of saponification was 98.5 mol %, and the content of 1,2-glycol bond was 1.6 mol %. The analysis results and evaluation is results for the resultant modified PVA are shown in Table 2.

Example 5 and Comparative Examples 3 and 4

A modified PVA was produced in the same manner as in Example 1 except that the introduced amount of vinyl acetate and methanol, the type and addition amount of the comonomer used in the polymerization, the polymerization temperature, the polymerization ratio, and the saponification conditions were changed as shown in Table 1. In Example 5, allyl acetate (AAc) was used as the comonomer. The AAc is the compound represented by formula (2) in which $R^1$ is a hydrogen atom and $R^2$ is a methyl group. In Comparative Example 3, isopropenyl acetate (IPAc) was used as the comonomer. The IPAc forms a structure in which hydroxyl groups are directly bonded to the main chain of the PVA. In Comparative Example 4, 3-methyl-3-buten-1-ol (IPEA) was used as the comonomer. The IPEA forms a structure in which 2-hydroxyethyl groups are bonded to the main chain of the PVA. The analysis results and evaluation results for the resultant modified PVA are shown in Table 2.

TABLE 1

| | Vinyl acetate Addition amount (parts) | Methanol Addition amount (parts) | Comonomer Type | Comonomer Addition amount (parts) | Polymerization temperature (°C.) | Polymerization ratio (%) | Saponification conditions PVAc concentration (%) | Saponification conditions NaOH Molar ratio |
|---|---|---|---|---|---|---|---|---|
| Example 1 | 1969 | 231 | MAAc | 26.8 | 60 | 27 | 20 | 0.03 |
| Example 2 | 1804 | 396 | MAAc | 24.5 | 40 | 28 | 20 | 0.03 |
| Example 3 | 2112 | 88 | MAAc | 58.0 | 60 | 12 | 20 | 0.03 |
| Example 4 | 2280 | 120 | MAAc | 147.0 | 60 | 10 | 20 | 0.03 |
| Example 5 | 1826 | 374 | AAc | 24.0 | 40 | 25 | 20 | 0.03 |
| Comparative Example 1 | 1716 | 484 | MAAc | 23.3 | 60 | 35 | 20 | 0.03 |
| Comparative Example 2 | 1804 | 396 | — | — | 60 | 32 | 20 | 0.03 |
| Comparative Example 3 | 1793 | 407 | IPAc | 21.2 | 60 | 30 | 20 | 0.03 |
| Comparative Example 4 | 2280 | 120 | IPEA | 23.4 | 60 | 27 | 20 | 0.03 |

MAAc: 2-methyl-2-propenyl acetate
AAc: Allyl acetate
IPAc: Isopropenyl acetate
IPEA: 3-methyl-3-buten-1-ol

TABLE 2

| | Analysis results of modified PVA | | | | Evaluation of water solubility | | Evaluation of film | |
|---|---|---|---|---|---|---|---|---|
| | Viscosity-average polymerization degree | Amount of modification (mol %) | Saponification degree (mol %) | Content of 1,2-glycol bond (mol %) | Solubility | Foaming and defoaming properties | Film strength | Oxygen permeability *1) |
| Example 1 | 2400 | 1 | 98.5 | 1.6 | A | A | B | 42 |
| Example 2 | 2400 | 1 | 98.5 | 1.3 | A | A | A | 39 |
| Example 3 | 2100 | 2 | 98.5 | 1.6 | A | A | B | 44 |
| Example 4 | 2100 | 5 | 98.5 | 1.6 | A | A | C | 50 |
| Example 5 | 2400 | 1 | 98.5 | 1.3 | A | A | B | 49 |
| Comparative Example 1 | 1700 | 1 | 98.5 | 1.6 | A | A | D | 42 |
| Comparative Example 2 | 2400 | — | 98.5 | 1.6 | C | C | C | 41 |
| Comparative Example 3 | 2400 | 1 | 98.5 | 1.6 | B | A | C | 57 |
| Comparative Example 4 | 2400 | 1 | 98.5 | 1.6 | A | B | D | 78 |

*1) Oxygen permeability in terms of thickness of 20 μm (cc/m² · day · atm)

As is obvious from Examples 1 to 5, the modified polyvinyl alcohol of the present invention has improved the water solubility and is useful in industrial applications. Further, it can be seen that the film of the modified polyvinyl alcohol of the present invention has excellent gas barrier properties while maintaining high strength even under high humidity conditions. On the other hand, in the case where the degree of polymerization was low (Comparative Example 1), sufficient film strength was not exhibited. In the case where no modification was applied (Comparative Example 2), the handleability in the form of an aqueous solution was poor. In the case of using another comonomer (Comparative Examples 3 and 4), sufficient film strength was not exhibited under high humidity conditions, and the gas barrier properties were also reduced.

The invention claimed is:

1. A modified polyvinyl alcohol comprising 0.1 to 10 mol % of a monomer unit represented by formula (1) and having a degree of polymerization exceeding 2000 and a content of a 1,2-glycol bond in a main chain of 1.5 mol % or less:

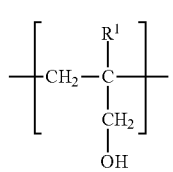
(1)

wherein, in formula (1), $R^1$ represents a methyl group.

2. A method for producing the modified polyvinyl alcohol according to claim 1, comprising copolymerizing a vinyl ester monomer with a compound represented by formula (2), followed by saponification
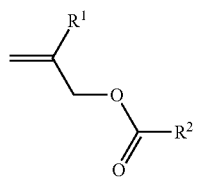
(2)
wherein, in formula (2), $R^1$ is a methyl group, and $R^2$ represents an alkyl group having 1 to 10 carbon atoms.
* * * * *